Sept. 19, 1939.   H. C. PIERLE   2,173,633
TOOL HOLDER FOR LATHES
Filed Dec. 8, 1937
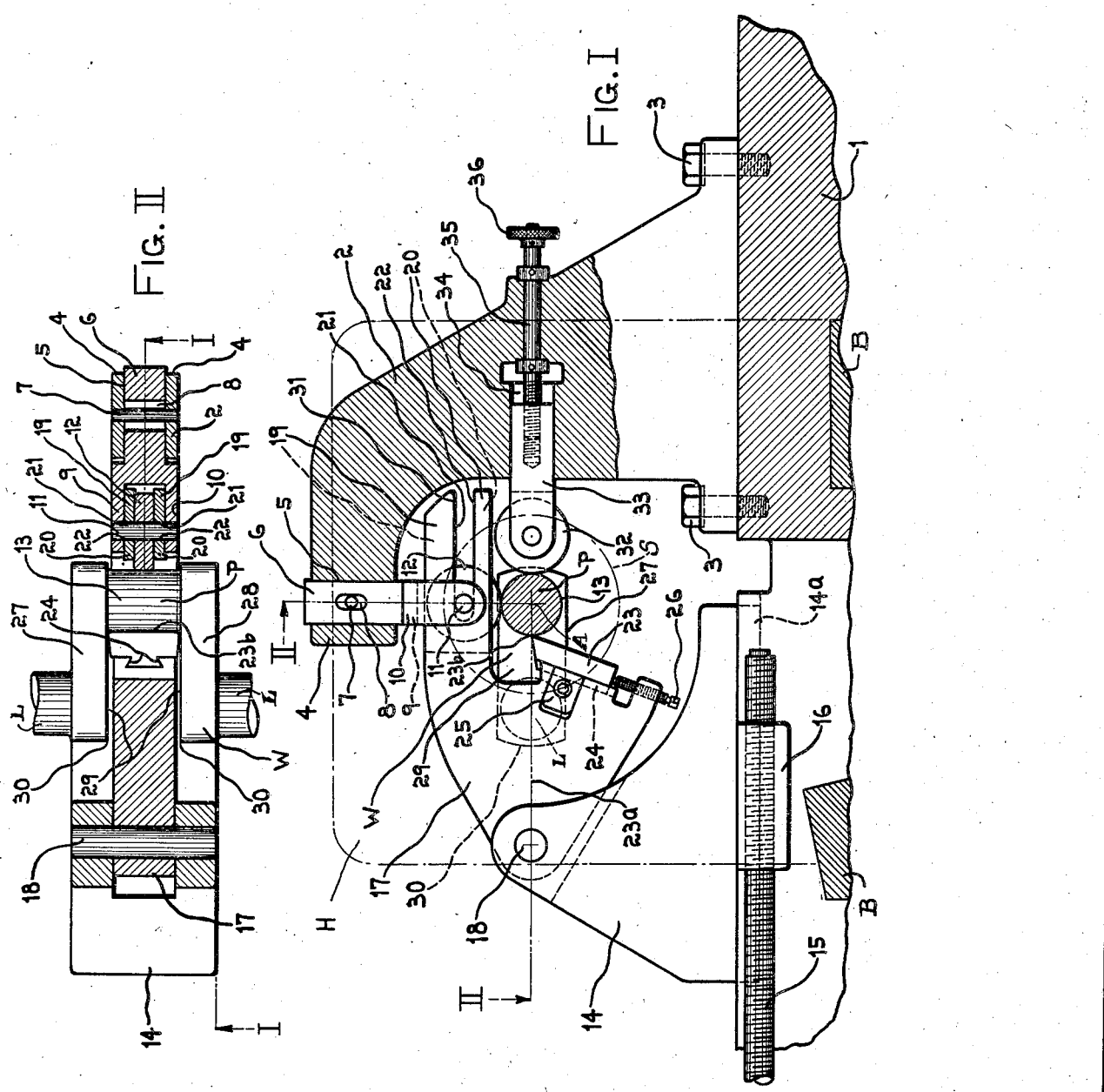
WITNESS.
Orlando S. Knox
INVENTOR.
HENRY C. PIERLE
BY Willard L. Greene
ATTORNEY.

Patented Sept. 19, 1939

2,173,633

UNITED STATES PATENT OFFICE 2,173,633

TOOL HOLDER FOR LATHES

Henry C. Pierle, Cincinnati, Ohio, assignor to The R. K. Le Blond Machine Tool Company, Cincinnati, Ohio, a corporation of Delaware Application December 8, 1937, Serial No. 178,755

12 Claims. (Cl. 82—35)

This invention pertains to tool holders for lathes, and more particularly to tool holders which are pivotally mounted on the tool feed carriage of the lathe and which tool holders are floatingly supported at their outer ends on the work surface of the work piece being machined. Heretofore in tool holders of this character it has been difficult to arrange such tool holders for machining faces far radially extending from the axis of rotation of the work when it is desirable to cause relative feeding of the tool holder and the work piece in a direction perpendicular to the axis of rotation of the work piece. By my invention I am able to utilize such a tool holder for machining such radially extending surfaces as for example the faces or cheeks of crankshaft webs as the tool is fed toward the axis of rotation of the work piece.

An object of my invention is to provide a pivotally mounted tool holder which may be fed perpendicular to the axis of rotation of the work piece and which has an arrangement for floatingly supporting the outer end of said tool holder on the work piece being turned so that a relatively large amount of movement of said tool holder, perpendicular to said axis of rotation of the work piece, may be obtained.

Another object of my invention is to provide a pivotally mounted tool holder on a work carriage which is floatingly supported at its outer end by an anti-friction arrangement which at all times properly engages the work piece to be machined during the large relative travel of the cutting tool of said work holder perpendicular to the axis of rotation of the work piece.

Another object of my invention is to provide a pivotally mounted tool holder on a work carriage, movable perpendicular to the axis of rotation of the work piece being turned and which tool holder is floatingly supported at its outer end by means which is floatingly supported on the work piece for movement in a direction at right angles to the direction of feed of the tool holder but which is fixed on the carriage or frame of the lathe against movement in a direction parallel with the direction of feeding of said tool holder.

Further objects and advantages of my invention will appear from the detailed description of the drawing in which:

Figure I is a partial vertical transverse section through a portion of a lathe, showing the novel tool holder arrangement applied thereto, substantially on the line I—I of Figure II.

Figure II is a diagrammatic section through the arrangement shown in Figure I on the line II—II of said figure.

For purposes of an exemplary disclosure, I have shown my invention applied to an ordinary engine lathe having the usual carriage 1 mounted on the bed B of said lathe which also has the usual headstock H and work spindle S for rotating the work piece on the axis A for turning either the line bearings or pin bearings of a crankshaft W depending upon which bearings are placed in the lathe with their axes coinciding with the spindle axis A of the lathe. As illustrated in the drawing a crank pin is being turned, the line bearings in this case traveling in an orbit about the axis A as is commonly done when turning crank pins in such a lathe.

For purposes of simplifying the description of the underlying basic principles of my invention, all parts of the machine which have no movement relative to the bearing being turned, such as the bed B, the headstock H, the carriage 1, and any member fixed on said carriage may be considered as the frame of said lathe.

This invention is equally well adapted for use in an orbital lathe, for example, of a character shown in my Patent 2,089,421 in which the crank pins of a crankshaft are turned while the crankshaft is rotated on the axis of its line bearings. In this instance the carriage 1 would be moved in orbital movement to cause the entire arrangement of Fig. I to follow the orbital path of the crank pin being turned, the direction of feeding and general arrangement of the tool holder being substantially like that shown in the above mentioned patent.

On the lathe carriage 1 is mounted an upright support 2 by bolts 3, the upright support 2 having a horizontal projecting portion 4 at its upper end through which is formed a square hole 5 in which is slidably mounted a forked piece 6 for vertical movement up and down in the hole 5. A pin 7 fixed in the upright support 2 and passing transversely across the hole 5 also passes through an elongated hole 8 in the forked piece 6 to retain the forked piece 6 in the support 2 while at the same time allowing it limited sliding up and down movement in the support 2. In the lower bifurcated portion comprising the forked pieces 9 and 10 of the member 6 is fixed a pin 11 upon which is rotatably mounted a roller 12 which rests on the work surface or in this case the surface 13 of a crank pin P so that the forked piece 6 floatingly rests on the work surface 13 and is free to move up and down in the hole 5 under the influence of this work surface as the work piece W rotates in the lathe.

The lathe cross slide 14 is mounted on suitable ways 14a on the lathe carriage 1 and is actuated for movement perpendicular to the axis of rotation of the work by a suitable screw 15 and nut 16 attached to the cross slide 14.

On the cross slide 14 is pivotally mounted the tool holder 17 by means of a suitable pin 18 fixed in the cross slide. The tool holder 17 has a pair of spaced bifurcated end portions comprising the upper members 19 and the lower members 20 which pass through the bifurcated portion forked piece 6 each side of the roller 12. The surfaces 21 of portions 19 and the surfaces 22 of the portions 20 slidingly engaging each side of the pin 11 in the forked piece 6. By this arrangement the tool holder is adapted to more perpendicular of the axis of rotation of the work piece and is adapted to be swung in an arcuate path substantially perpendicular to said line of feeding movement by the floating movement imparted to the forked piece 6 and its pin 11 as the roller 12 rides on the work surface 13 as described. By having the slotted arrangement formed by surfaces 21 and 22 far extended, the tool holder may be fed a relatively long distance perpendicular to the axis of rotation of the work piece. A cutting tool 23 is mounted on the tool holder 17 by a dovetail arrangement 24 having an appropriate clamping means 25 and a suitable adjustable back up screw 26 for properly positioning the cutting tool relative to work surface to be machined. As this tool holder is fed along the line 23a to the work piece or crankshaft W having webs 27 and 28 with the cheeks 29 to be machined, the tool first begins to engage the webs at a point 30 at which time the pin 11 engages the surfaces 21 of the portions 19 of the tool holder at a point 31. As the machining proceeds and the cutting tool 23 is fed along line 23a perpendicular to the axis of rotation of the work and down the cheeks 29 until it engages the surface 13 of the crank pin as shown in the figures. The pin 11 during this time moves into the slot formed by the surfaces 21 and 22. Thus by this arrangement the tool holder 17 is at all times floatingly supported on the work surface 13 while at the same time is adapted to be fed a relatively long distance down the cheeks 29 of the crankshaft webs 27 and 28 while at all times maintaining the cutting edge 23b of the tool 23 in the line 23a so as to maintain the proper relationship of the cutting tool to the work surface being machined. In devices heretofore used the roller 11 is carried on the tool holder and when they were used to perform this type operation the roller would have to be impracticably large or else the roller would not remain in contact with the work surface 13 at a position perpendicular above the axis of rotation of the work as shown in Figure I so that the cutting tool would either be far above or far below the horizontal line between the axis of rotation of work piece and the pivot pin 18. This would be particularly objectionable in cases where facing operations such as machining cheeks 29 of the webs 27 and 28 on the crankshaft W were to be accomplished.

In instances where it is desirable to do extremely heavy cutting on the work surface 13 it may be desirable to provide a back up roller 32 carried in a bifurcated member 33 slidably mounted in a slot 34 in the support 2 and which may be moved in and out of said slot by rotating the screw arrangement 35 having the thumb nut 36 so as to give added support to the work piece against the surface 13 after it has been roughed down to a concentric diameter. Ordinarily this latter arrangement of the back up roller 32 is not necessary for normal machining operations on the work piece.

Having fully set forth and described my invention what I claim as new and desire to secure by United States Letters Patent is:

1. In a lathe, a frame, a rotatable work holder mounted on said frame, means carried in said frame and floatingly supported on a work piece in said work holder, a slide mounted on said frame for movement relative to said work piece, a tool holder pivotally mounted on said slide and supported at its outer end by said first mentioned means, a tool in said tool holder, means for rotating said work holder, and means for feeding said slide.

2. In a lathe, a frame, a rotatable work holder mounted on said frame, means carried in said frame and floatingly supported on a work piece in said work holder for movement in a direction perpendicular to the axis of rotation of the work surface being turned, a slide mounted on said frame for movement relative to said work piece in a direction perpendicular to the direction of floating movement of said first mentioned means, a tool holder pivotally mounted on said slide and supported at its outer end by said first mentioned means, a tool in said tool holder, means for rotating said work holder, and the means for feeding said slide.

3. In a lathe, a frame, a rotatable work holder mounted on said frame, means carried in said frame and floatingly supported on the work surface being turned for movement in a vertical direction, a slide mounted on said frame for movement in a horizontal direction relative to said work piece, a tool holder pivotally mounted on said slide and supported at its outer end by said first mentioned means, a tool in said tool holder, means for rotating said work holder, and means for feeding said slide.

4. In a lathe, a frame, a rotatable work holder mounted on said frame, a carriage mounted on said frame for movement longitudinally of the axis of rotation of the work piece in said work holder, a support fixed on said carriage, a member floatingly mounted in said support and resting upon the work surface being machined, a slide mounted on said carriage for movement perpendicular to the axis of rotation of the work surface being machined, a tool holder pivotally mounted in said slide, a tool in said tool holder, said tool holder supported at its outer end on the means floatingly mounted in said support, means for rotating said work holder, and means for feeding said tool slide.

5. In a lathe, a frame, a rotatable work holder mounted on said frame, a carriage mounted on said frame for movement longitudinally of the axis of rotation of said work holder, a support fixed on said carriage extending over said work piece in said work holder, a member vertically reciprocatable in said support and floatingly supported at its lower end on the work surface being machined on said work piece, a tool slide movably mounted on said carriage for movement perpendicular to the axis of rotation of said work piece, a tool holder pivotally mounted on said tool slide, a tool in said tool holder adapted to engage the work surface being machined from a horizontal direction, means for mounting the outer end of said tool holder on said means mounted in said support whereby said tool holder is at all times carried by said floating member throughout the limit of travel of said tool slide, means for rotating said work holder, and means for feeding said tool slide.

6. In a lathe, a frame, a rotatable work holder mounted on said frame, means carried in said frame and floatingly supported for movement perpendicular to the axis of rotation of the work surface being turned on the work piece in said work holder, a slide mounted on said frame for movement relative to said work piece in a direction substantially perpendicular to the direction of movement of said floatingly supported means, a tool holder pivotally mounted on said slide and supported at its outer end by said floatingly supported means, a tool in said tool holder, means in said support adapted to be adjusted against the work surface being turned and to contact said work piece at a point diametrically opposite the point of engagement of said cutting tool with said work surface being machined, means for rotating said work holder, and means for feeding said slide.

7. In a lathe, a bed, a rotatable work holder mounted on said bed, a carriage mounted for longitudinal movement on said bed, an upright support fixed on said carriage and having an end portion extending over a work piece in said work holder, a forked member slidably mounted in said end portion for movement in a vertical direction, a pin fixed in the bifurcated portion of said forked member, a roller rotatably mounted on said pin and resting on the work surface to be machined on a work piece in said work holder, a cross slide mounted on said carriage for horizontal movement in a direction perpendicular to the axis of rotation of said work holder, a tool holder pivotally mounted on said slide for swinging movement in a plane perpendicular to the axis of rotation of said work piece, a slotted end portion on said tool holder engaging about said pin in said forked member, a cutting tool mounted on said tool holder and having its cutting edge in a plane passing through the axis of said pivotal mounting and the axis of work rotation, means for rotating said work holder, and means for feeding said cross slide.

8. In a lathe, a bed, a rotatable work holder mounted on said bed, a carriage mounted for longitudinal movement on said bed, an upright support fixed on said carriage and having an end portion extending over a work piece in said work holder, a forked member slidably mounted in said end portion for movement in a vertical direction, a pin fixed in the bifurcated portion of said forked member, a roller rotatably mounted on said pin and resting on the work surface to be machined on a work piece in said work holder, a second forked member slidably mounted in said upright support for movement in a horizontal direction, a roller in said second forked member, manual operating means for moving said second forked member to engage its roller with the work surface to be machined on said work piece, a cross slide mounted on said carriage for horizontal movement in a direction perpendicular to the axis of rotation of said work holder, a tool holder pivotally mounted on said slide for swinging movement in a plane perpendicular to the axis of rotation of said work piece, a slotted end portion on said tool holder engaging about said pin in said first mentioned forked member, a cutting tool mounted on said tool holder and having its cutting edge in a plane passing through the axis of said pivotal mounting and the axis of work rotation, means for rotating said work holder, and means for feeding said cross slide.

9. In a lathe, means for supporting and rotating a work piece to be turned, a cutting tool adapted to be moved in a plane substantially tangentially of the work surface to be machined on said work piece, means for feeding said tool relative to said work surface substantially perpendicular to said mentioned plane, and means independent of said work piece for supporting a movable member the movement of which member is dependent upon said work piece, said movable member being interrelated with said tool to effect tangential movement of said tool.

10. In a lathe, means for supporting and rotating a work piece to be turned, a cutting tool adapted to be moved in a plane substantially tangentially of the work surface to be machined on said work piece, means for feeding said tool relative to said work surface substantially perpendicular to said mentioned plane, means independent of said work piece for supporting a movable member which engages said work piece and is moved by said work piece in a plane substantially parallel with said plane of tangential movement of said tool, and means whereby movement of said movable member effects tangential movement of said tool.

11. In a lathe, means for supporting and rotating a work piece to be turned, a cutting tool adapted to be moved in a plane substantially tangentially of the work surface to be machined on said work piece, means independent of said work piece for supporting a movable member which engages said work piece and is moved by said work piece in a plane substantially parallel with said plane of tangential movement of said tool, means whereby movement of said movable member effects tangential movement of said tool, and means for feeding said tool relative to said work piece independently of said movable member.

12. In a lathe, means for supporting and rotating a work piece to be turned, a cutting tool adapted to be moved in a plane substantially tangentially of the work surface to be machined on said work piece, means for feeding said tool relative to said work surface substantially perpendicular to said mentioned plane, means independent of said work piece for supporting a movable member the movement of which member is dependent upon said work piece, said movable member being interrelated with said tool to effect tangential movement of said tool, and means independent of said work piece for engaging said work piece from a direction substantially perpendicular to said plane of tangential movement of said tool.

HENRY C. PIERLE.